United States Patent [19]

Oku et al.

[11] Patent Number: 5,895,138
[45] Date of Patent: Apr. 20, 1999

[54] CONVEYOR BELT AND PHOTOSENSITIVE-MATERIAL TRANSPORT APPARATUS USING THE BELT

[75] Inventors: Hiroshi Oku; Keiji Morimoto; Mikio Inoue, all of Wakayama, Japan

[73] Assignee: Noritsu Koki Co., Ltd., Osaka, Japan

[21] Appl. No.: 08/865,116

[22] Filed: May 29, 1997

[30] Foreign Application Priority Data

May 31, 1996 [JP] Japan ................... 8-138651

[51] Int. Cl.⁶ ..................... G03D 3/08; B65G 15/02
[52] U.S. Cl. ............... 396/612; 355/76 L; 198/831; 198/847
[58] Field of Search .................. 355/76, 27–29; 198/847, 840, 831, 852; 396/612, 620

[56] References Cited

U.S. PATENT DOCUMENTS

| | | | |
|---|---|---|---|
| 4,853,730 | 8/1989 | Kurths | 396/652 |
| 4,903,074 | 2/1990 | Lama et al. | 355/76 |
| 5,240,531 | 8/1993 | Toda et al. | 156/137 |
| 5,667,058 | 9/1997 | Bonnet | 198/831 |

OTHER PUBLICATIONS

Patent Abstracts of Japan, publ. No. 02 286 504 (1989).

*Primary Examiner*—D. Rutledge
*Attorney, Agent, or Firm*—Fulbright & Jaworski, LLP

[57] ABSTRACT

A conveyor belt includes a PET film as a core and an urethane layer formed on a surface of the PET film by screen-printing urethane beads containing ink. This conveyor belt is for use in a belt type photosensitive-material storage section of a photosensitive-material transport apparatus in order to absorb difference in processing capacities of a printing section and a developing section.

6 Claims, 5 Drawing Sheets print paper

CONVEYOR BELT AND PHOTOSENSITIVE-MATERIAL TRANSPORT APPARATUS USING THE BELT

BACKGROUND OF THE INVENTION

1. Field of the Invention

The present invention relates to a conveyor belt, more particularly, a thin conveyor belt suitable for use in a photosensitive-material transport apparatus incorporated in a photographic processing system. The invention relates also to the photosensitive-material transport apparatus using such conveyor belt.

2. Description of the Related Art

Conventionally, the conveyor belt of the above-noted type is fabricated by coating a core formed typically of cloth or nylon cord, with coating material such as rubber or plastic. In case the belt is employed in a photosensitive-material transport apparatus, it is required that the conveyor belt have a certain amount of coefficient of friction. For this reason, the plastic-coated conveyor belt is not preferred. On the other hand, in the case of the rubber-coated conveyor belt, the thickness of the rubber coating should be minimized in order to reduce the thickness of the belt. However, this is only possible at the costs of reduced durability of the belt. In addition to the above, it has been also proposed to fabricate a thin conveyor belt by impregnating a cloth core with rubber material. This type of belt suffers disadvantage of tendency to elongate, which makes it difficult to transport objects (e.g. photosensitive materials) one after another with an appropriate and correct spacing therebetween. Further, the belt of this type suffers another disadvantage of insufficient rigidity, i.e. stiffness of the belt per se. The insufficient stiffness presents difficulty in taking appropriate measure required for preventing 'wobbling' of the belt by e.g. laterally restricting the travel of the belt by means of a guide plate(s).

SUMMARY OF THE INVENTION

In view of the above-described state of the art, a primary object of the present invention is to provide a conveyor belt which may be formed thin to obtain good flexibility while maintaining sufficient stiffness as well as sufficient coefficient of friction on the conveyor surface thereof. The invention intends also to provide a photosensitive-material transport apparatus using such belt capable of transporting the materials in succession with maintaining appropriate and correct spacing therebetween.

For fulfilling the above object, a conveyor belt, according the present invention, comprises a core formed of a plastic film and an elastic material layer formed on a surface of the core. With this construction, the core is formed of a plastic film which may be formed thin while maintaining sufficient stiffness. And, on the surface of this plastic film core, there is formed the elastic material layer having a high coefficient of friction. Accordingly, there has been achieved a conveyor belt which may be formed thin and therefore flexible and which may at the same time maintain sufficient stiffness and high friction coefficient on the conveyor surface thereof.

According to one preferred embodiment of the invention, it is proposed to employ an urethane layer as the elastic material layer. Alternatively, the elastic material layer may be formed also of vulcanized rubber or thermoplastic elastomer. However, for use in a photosensitive-material conveyor belt employed in a photographic processing system, an urethane layer is preferred in terms of durability and surface properties.

In order to form the urethane layer on the surface of the plastic film core, according to the present invention, it is proposed to apply e.g. urethane beads containing ink on the surface of the plastic film. By forming the urethane layer by applying urethane beads containing ink, it is possible to reduce the thickness of this layer, in comparison with other conceivable methods of e.g. impregnating the fiberous core with urethane material or affixing a pre-formed urethane layer on the belt core. In doing this, if preparation and setting of drying conditions of the urethane beads containing ink are effected in such a manner as to allow the reactive group of urethane beads to be retained after the application and subsequent drying of the urethane beads containing ink, it becomes possible to obtain a still higher coefficient of friction, thus restricting more effectively slipping displacement of the objects transported on the belt.

According to a further embodiment of the present invention, the plastic film core comprises a PET film, and the urethane layer is formed by screen-printing of the urethane beads containing ink on the PET film core. With the use of the screen-printing method in forming the urethane layer, the urethane layer may be formed in uniform thickness. With this method, it becomes also possible to form the urethane layer in a variety of printing patterns in accordance with the necessity. Hence, it becomes advantageously possible to e.g. allow urethane layer portions and non-urethane layer portions to coexist according to a high-precision printing pattern on the conveyor surface of the belt.

According to a still further embodiment of the present invention, the conveyor belt has a total thickness ranging between 0.2 and 0.3 mm. With this specific setting of total thickness, an irregularity in the transporting pitch of the photosensitive material may be advantageously reduced to be almost negligible. Such transporting pitch irregularity inevitably occurs due to difference in length between the conveyor belt and the photosensitive material when the material transported on the belt is caused to move while being turned or flexed outwardly and inwardly by means of turn, i.e. direction-switching rollers. In the case of the conventional conveyor belt having significant thickness, the transporting pitch irregularity becomes particularly conspicuous in the case of transportation of a print paper (an example of photosensitive material) of greater length such as of the panoramic size. Then, this irregularity may be advantageously minimized by forming the conveyor belt in the specified range of 0.2 to 0.3 mm. For realizing such minimal belt thickness, the invention proposes screen-printing the urethane beads containing ink in the thickness of 0.05 to 1 mm on the PET film core having a thickness of 0.15 to 0.20 mm. In this case, the conveyor belt may obtain all the requirements of sufficient flexibility, stiffness and friction coefficient in the transport surface to be suitable for use as the conveyor belt of the photosensitive material transport apparatus for transporting photosensitive material such as print paper within a photographic processing system.

By using the above-described conveyor belt which has superior flexibility and stiffness as well as high coefficient of friction in the transport surface, it becomes readily possible to equip the photosensitive material transport apparatus with transport length adjusting means for adjusting an effective transport length. For, in order to vary the effective transport length, the transport length adjusting means effects this generally by a plurality of turn rollers varying an inter-axis distance thereof. Therefore, in order to form the entire transport length adjusting means compact, it is necessary to reduce the radius of turning of the conveyor belt. Moreover, if a transport area adjusted to a desired effective transport length includes a vertical storage line for temporarily storing the photosensitive material on the conveyor belt, the retaining force of the transport surface for retaining the photosensitive material, i.e. the friction coefficient, becomes another important factor for consideration.

Further, in order to restrict wobbling of the conveyor belt, it is effective to provide, in the vicinity of the turn rollers, anti-wobbling guide plates for guiding opposed side edges of the belt. However, in the case of the conventional conveyor belt comprising a rubber belt, the belt cannot effectively resist the wobbling tendency, such that 'wrinkles' are formed therein. Accordingly, the above-described guide plates cannot be employed, and instead, difficult arrangement or setting of the configuration of the conveyor belt and/or belt tension control becomes necessary for achieving the same purpose. On the other hand, in the case of the conveyor belt according to the present invention, in particular, the belt using the PET film as the core thereof, this belt has sufficient stiffness, so that the anti-wobbling measure may be provided more reliably and at lower costs by means of the anti-wobbling guide plates.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
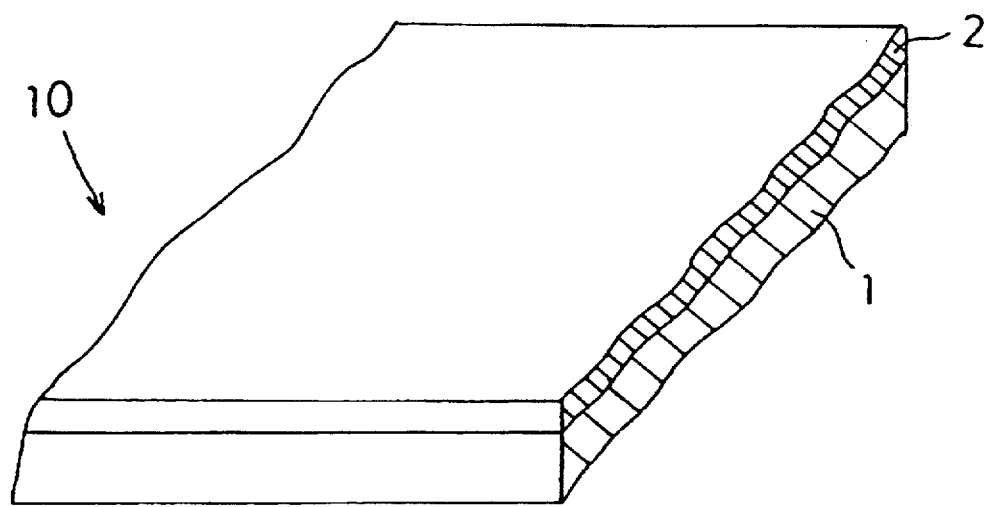
FIG. 1 is a perspective view in partial section of a conveyor belt according to the present invention.

FIG. 1 shows a conveyor belt 10 fabricated by: preparing a plastic core 1 from an elongate PET film having a thickness of 0.18 mm and a width of 150 mm; and forming, on the surface of the core 1, an urethane layer 2 having a thickness of 0.07 mm by screen-printing urethane beads containing ink on the core surface. In this printed urethane layer 2, the urethane reactive group is retained in the urethane beads thereof, so as to enhance the coefficient of friction of the urethane layer 2. The retention of the urethane reactive groups is realized by appropriate preparation of two-liquid curing type urethane beads ink and selection of drying conditions therefor. The conveyor belt 10 is formed into an endless belt by bonding opposed ends thereof with each other, using the ultrasonic bonding method or high-frequency bonding method.

Figure 2:
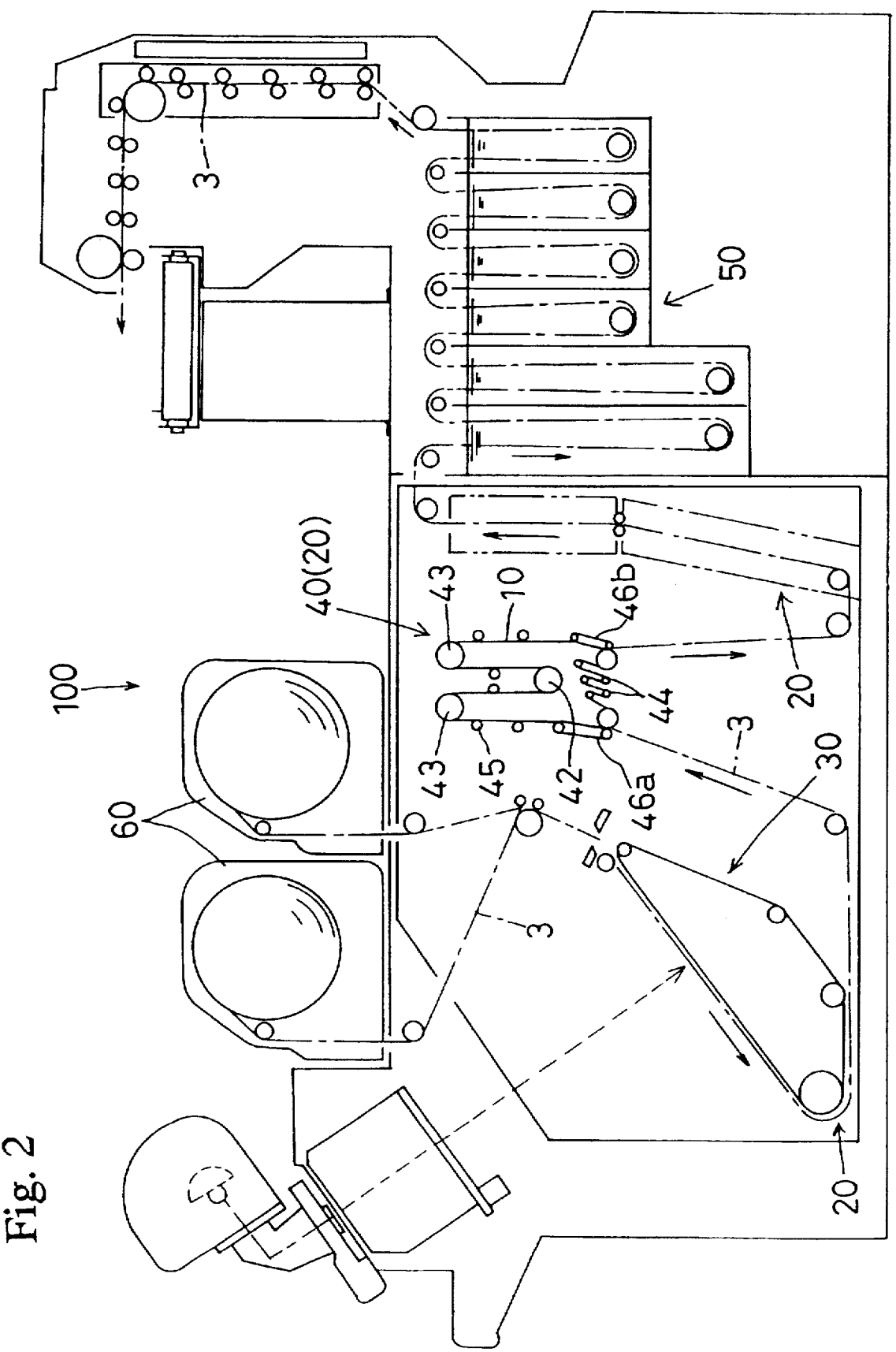
FIG. 2 is a section view of a construction of a photographic processing system using the conveyor belt according to the invention.
Figure 3:
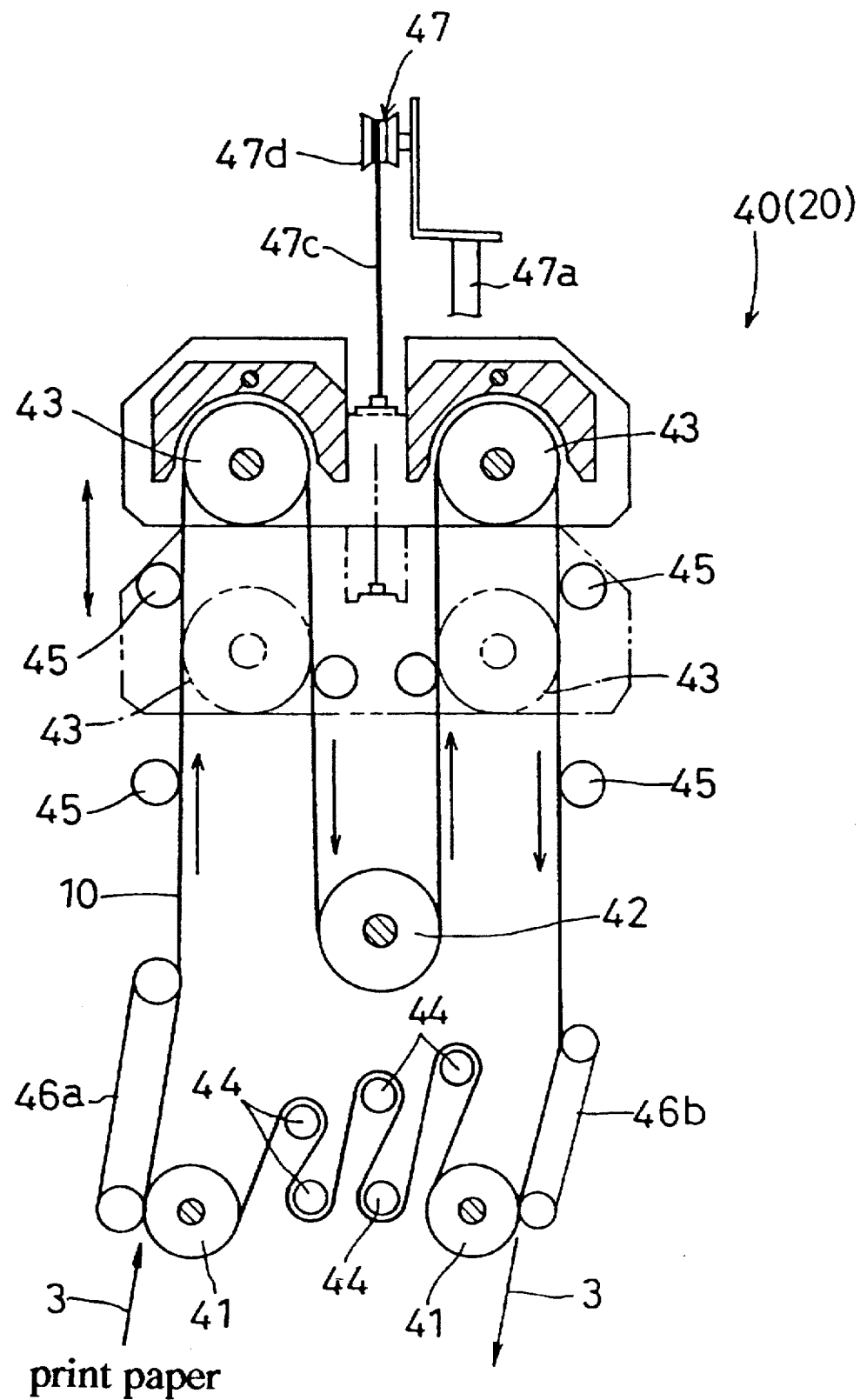
FIG. 3 is a schematic of a photosensitive material storage section using the conveyor belt of the invention.
Figure 4:
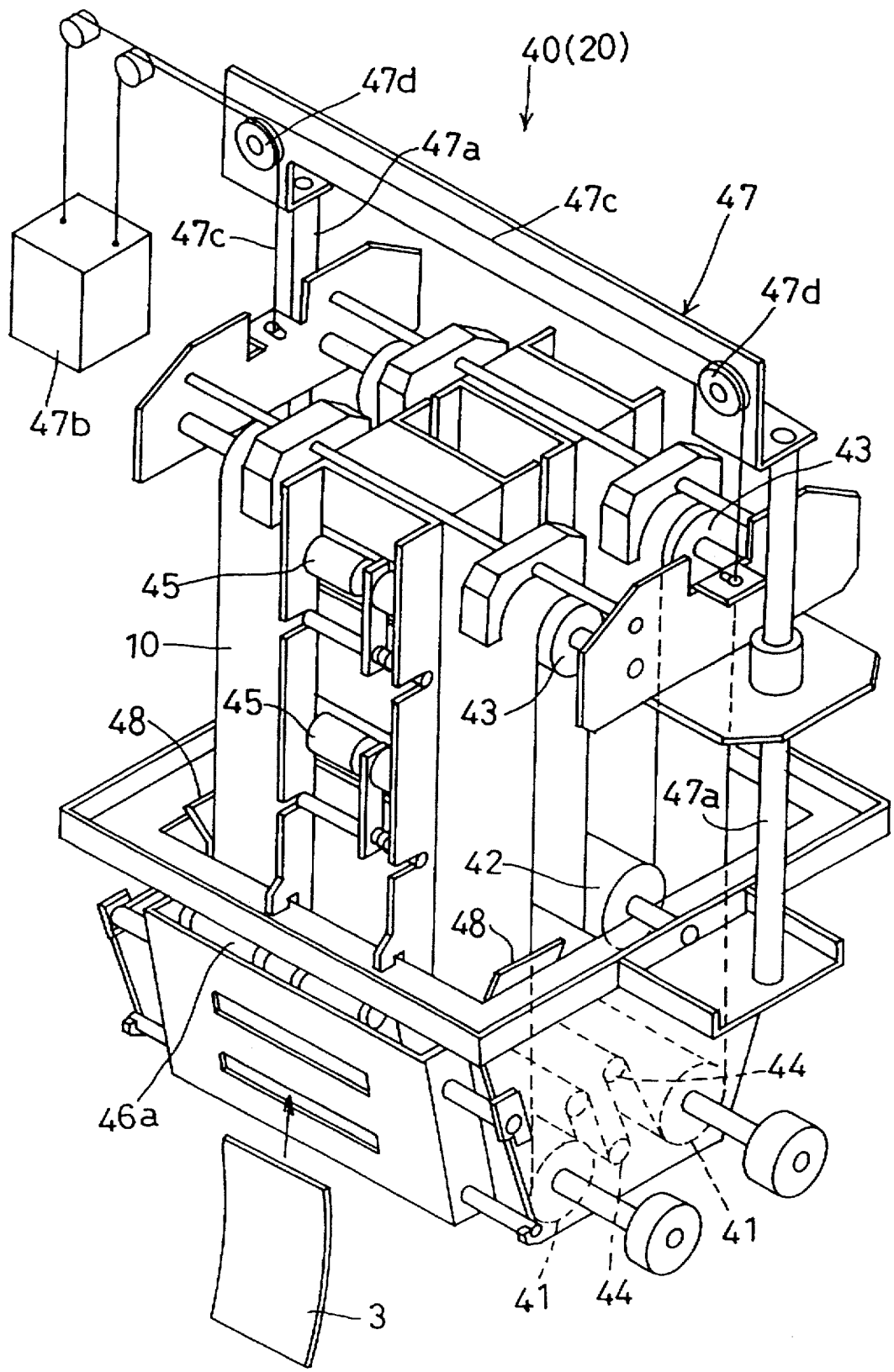
FIG. 4 is a perspective view of the photosensitive material storage section.

FIG. 2 shows a photographic processing system 100 incorporating a photosensitive-material transport apparatus 20 employing the conveyor belt 10 described above. This photographic processing system 100 includes a printing section 30, a photosensitive-material storage section 40, a developing section 50, and a photosensitive-material magazine 60. A print paper 3, an example of the photosensitive material, drawn out of the magazine 60 is printed and cut into a piece corresponding to one frame at the printing section 30 and is then temporarily stored at the photosensitive-material storage section 40. Thereafter, the print paper 3 is fed into the developing section 50 in association with an operational condition of this developing section 50. These transporting operations of the print paper 2 within the processing system 100 are effected by means of the photosensitive-material transport apparatus 20. The photosensitive-material storage section 40 constitutes a part of the transport apparatus 20 and this section provides a function to absorb difference in the operational capacities between the printing section 30 and the developing section 50. FIGS. 3 and 4 respectively are a schematic and an overall perspective view of the photosensitive-material storage section 40.

Next, the basic operational principle and construction of this storage section 40 will be described with reference to the schematic of FIG. 3.

In order to allow the conveyor belt 10 to form a belt transport line, the photosensitive-material storage section 40 includes drive rollers 41 for driving the belt 10, a fixed turn roller 42 functioning as a 180-degree turn roller for the conveyor belt 10, a plurality of dancer rollers 13 which also function as 180-degree turn rollers for the belt and which are vertically movable so as to vary an inter-axis distance relative to the fixed turn roller 42, a plurality of tension rollers 44 for adjusting tension in the belt 10, press rollers 45 disposed in opposition to the belt 10 across the print paper 3 therebetween for assisting accurate transportation of the paper 3, a charging guide conveyer 46a for guiding the print paper 3 as being charged into the photosensitive-material storage section 40, and a discharging guide conveyer 46b for guiding the print paper 3 as being discharged from the storage section 40. In operation, the print paper 3 fed from the printing section 30 is introduced into the belt transport line with the aid of the charging guide conveyer 46a. Then, along the transport line, the paper 3 is caused to travel past the dancer rollers 43 and the fixed turn roller 42 and subsequently discharged from the storage section 10 with the aid of the discharging guide conveyer 46b. That is to say, the length of the transport line extending from the disposing position of the charging guide conveyer 46a to the disposing position of the discharging guide conveyer 46b constitutes the effective transport length for the print paper 3. In other words, this effective transport length corresponds to a storage length for the print paper 3, which length can be varied by vertically moving the dancer rollers 43 relative to the fixed turn roller 42. And, the amount of this variation is compensated for by movement of the tension rollers 44. For this purpose, as may be clearly understood from FIG. 4, in order to allow the dancer rollers 43 to be moved in the above-described manner, there is provided a dancer-roller moving mechanism 47 including a slide shaft 47a, a weight 47b, a wire 47c connecting the weight 47b with the dancer rollers 43, and a turn pulley 47d for the wire 47c. In this particular embodiment, the dancer-roller moving mechanism 47, the dancer rollers 43 and the tension rollers 44 together constitute a transport length adjusting means. Then, in order to obtain a maximum storage length within a limited space in the above-described construction, it is required that the conveyor belt 10 be repeatedly turned 180 degrees with minimal turning radius. And, this requirement can be met by the conveyor belt 10 of the invention having the above-described features.

Figure 5:
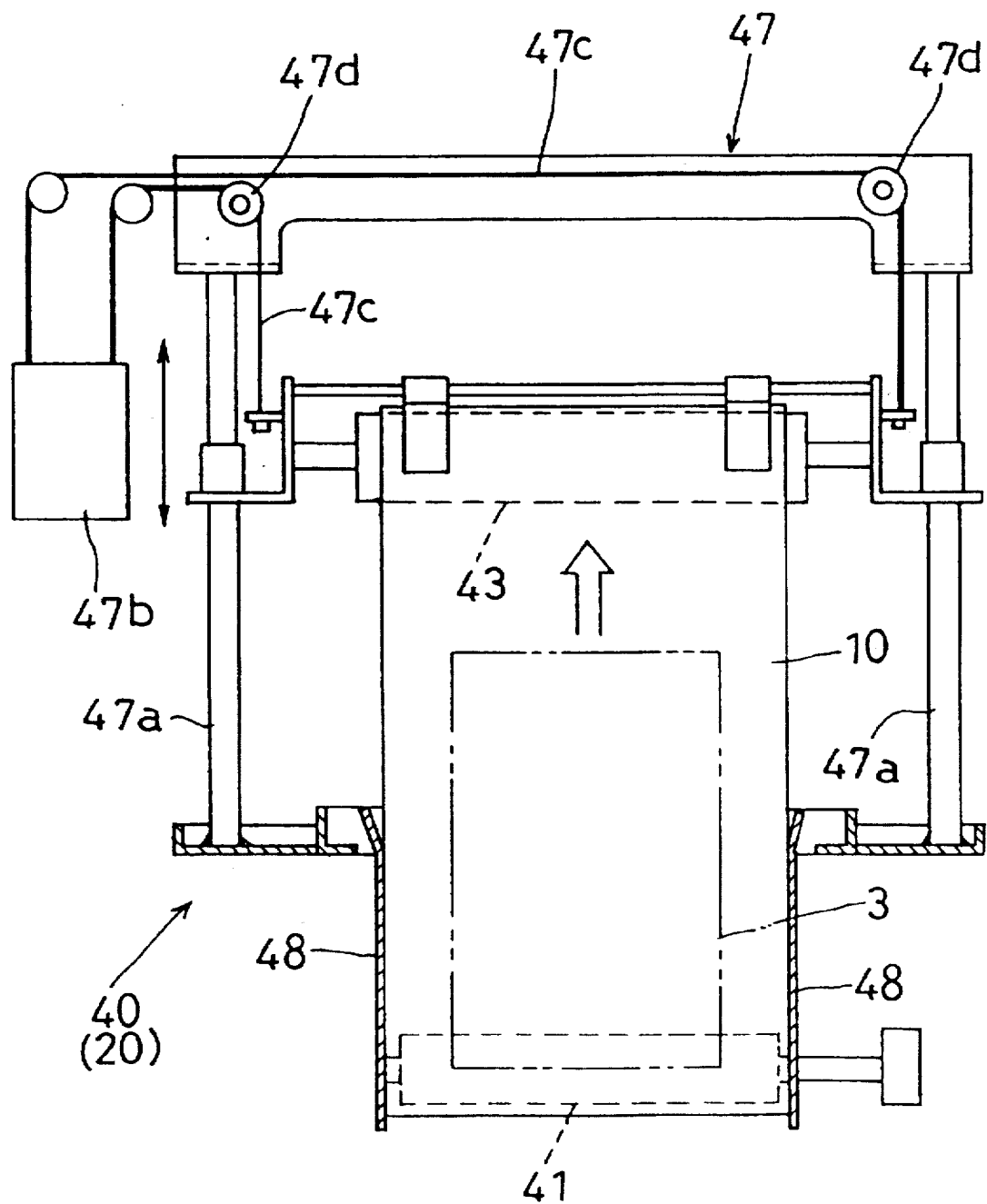
FIG. 5 is an explanatory view of anti-wobbling guide plates.

Further, for achieving accuracy in the transportation of the print paper 3, it is necessary to reliably restrict wobbling of the conveyor belt 10. Then, since this conveyor belt 10 of the invention has sufficient stiffness, i.e. transverse rigidity, due to the use of PET film as the core 1 thereof, as may be clearly understood from the explanatory view of FIG. 5, the wobbling tendency may be restricted simply and reliably by means of anti-wobbling guide plates 48 extending along the opposed side edges of the belt 10 in the vicinity of the drive roller 41.

[Other Embodiments]

In the foregoing embodiment, the PET film is employed as the core 1. Use of other plastic films selected depending on the required properties of the belt, use of one-liquid system type urethane beads containing ink rather than the two-liquid system type employed in the foregoing embodiment and also forming the urethane layer 2 by affixing pre-formed thin urethane film or film pieces on the core 1 rather than the screen-printing method are understood be all encompassed within the intended scope of the present invention. Also, the above-described specific numerical dimensional settings of the conveyor belt are provided as being suitable for the above-described particular storage transport construction for the print paper 3 at the photosensitive-material storage section 40. Other settings are also possible, depending on the construction of the transport apparatus employed.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A conveyor belt comprising:
   a core formed of a plastic film; and an elastic material layer formed on a surface of said core, wherein said elastic material layer is a urethane layer formed by applying urethane beads containing ink on the surface of the core.

2. A conveyor belt as claimed in claim 1, wherein the urethane layer retains the reactive group in the urethane beads after the application and drying thereof.

3. A conveyor belt as claimed in claim 1, wherein said plastic film core comprises a PET film, and said urethane layer is formed through screen-printing of said urethane beads containing ink on the PET film core.

4. A conveyor belt as claimed in claim 3, wherein the belt including the PET film and the urethane layer has a total thickness ranging between 0.2 and 0.3 mm.

5. A photosensitive-material transport apparatus for use in a photographic processing system, which comprises:
   a conveyor belt including:
      a core formed of a plastic film, and
      an elastic material layer formed on a surface of the core;
   a drive roller for driving the conveyor belt;
   a turn roller for switching over the traveling direction of the conveyor belt; and
   transport-length adjusting means for adjusting an effective transport length.

6. A photosensitive-material transport apparatus as claimed in claim 5, further comprising anti-wobbling guide plates for guiding opposed side edges of the conveyor belt for restricting wobbling thereof.

* * * * *